(12) United States Patent
Zhao et al.

(10) Patent No.: US 11,252,426 B2
(45) Date of Patent: Feb. 15, 2022

(54) SPATIALLY VARYING TRANSFORM WITH ADAPTIVE TRANSFORM TYPE

(71) Applicant: Huawei Technologies Co., Ltd., Shenzhen (CN)

(72) Inventors: Yin Zhao, Hangzhou (CN); Haitao Yang, Shenzhen (CN); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/104,866

(22) Filed: Nov. 25, 2020

(65) Prior Publication Data

US 2021/0084319 A1 Mar. 18, 2021

Related U.S. Application Data

(63) Continuation of application No. PCT/CN2019/088751, filed on May 28, 2019.
(Continued)

(51) Int. Cl.
*H04N 11/02* (2006.01)
*H04N 19/44* (2014.01)
(Continued)

(52) U.S. Cl.
CPC ........... *H04N 19/44* (2014.11); *H04N 19/136* (2014.11); *H04N 19/176* (2014.11); *H04N 19/625* (2014.11)

(58) Field of Classification Search
CPC ..................................................... H04N 19/44
(Continued)

(56) References Cited

U.S. PATENT DOCUMENTS

2003/0113026 A1 6/2003 Srinivasan et al.
2003/0156648 A1 8/2003 Holcomb et al.
(Continued)

FOREIGN PATENT DOCUMENTS

CN 101668205 A 3/2010
CN 102165771 A 8/2011
(Continued)

OTHER PUBLICATIONS

Akula, S., et al, "Description of SDR, HDR and 360 video coding technology proposal considering moibile application scenario by Samsung, Huawei, GoPro , and Hisilicon,", bu.joint Video Exploration Team(JVET) of ITU-T SG 16 WP 3 and ISO/IEC JTC 1/SC 29/WG 11, Document: JVET-J0024_v2, 10th Meeting : San Diego, US, Apr. 10-20, 2018, 120 pages.
(Continued)

*Primary Examiner* — Leron Beck
(74) *Attorney, Agent, or Firm* — Conley Rose, P.C.

(57) ABSTRACT

A video decoding method and apparatus employing spatially varying transform (SVT) with adaptive transform type include determining a usage of an SVT-vertical (V) or an SVT-horizontal (H) for a residual block, determining a transform block position of a transform block of the residual block, determining a transform type of the transform block, wherein the transform type indicates a horizontal transform and a vertical transform for the transform block, wherein at least one of the horizontal transform or the vertical transform is a discrete sine transform (DST)-7, and reconstructing the residual block based on the transform type, the transform block position and transform coefficients of the transform block.

20 Claims, 4 Drawing Sheets

SVT-V, position 0

SVT-V, position 1

SVT-V, position 2

SVT-H, position 0

SVT-H, position 1

SVT-H, position 2

Related U.S. Application Data

(60) Provisional application No. 62/678,738, filed on May 31, 2018.

(51) Int. Cl.
*H04N 19/136* (2014.01)
*H04N 19/176* (2014.01)
*H04N 19/625* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 2008/0232705 | A1 | 9/2008 | Sohn et al. |
| 2011/0170594 | A1 | 7/2011 | Budagavi et al. |
| 2012/0008683 | A1 | 1/2012 | Karczewicz et al. |
| 2012/0099642 | A1* | 4/2012 | Sole .............. H04N 19/46 375/240.03 |
| 2012/0128074 | A1* | 5/2012 | Zhang .............. H04N 19/51 375/240.18 |
| 2013/0259128 | A1* | 10/2013 | Song .............. H04N 19/50 375/240.12 |
| 2013/0315302 | A1 | 11/2013 | Lim et al. |
| 2014/0056347 | A1 | 2/2014 | Xu et al. |
| 2014/0119455 | A1 | 5/2014 | Kobayashi |
| 2014/0146891 | A1 | 5/2014 | Chuang et al. |
| 2014/0226721 | A1 | 8/2014 | Joshi et al. |
| 2014/0241424 | A1 | 8/2014 | Oh et al. |
| 2014/0286591 | A1 | 9/2014 | Cheon et al. |
| 2015/0350682 | A1 | 12/2015 | Zhang et al. |
| 2016/0219290 | A1 | 7/2016 | Zhao et al. |
| 2017/0094313 | A1 | 3/2017 | Zhao et al. |
| 2018/0115775 | A1* | 4/2018 | Song .............. H04N 19/11 |
| 2018/0376150 | A1 | 12/2018 | Iwamura et al. |
| 2019/0222843 | A1 | 7/2019 | Lee |
| 2020/0304816 | A1 | 9/2020 | Zhao et al. |
| 2020/0329253 | A1 | 10/2020 | Zhao et al. |

FOREIGN PATENT DOCUMENTS

| | | |
|---|---|---|
| CN | 102986215 A | 3/2013 |
| CN | 103108181 A | 5/2013 |
| CN | 103152563 A | 6/2013 |
| CN | 103370939 A | 10/2013 |
| CN | 103518374 A | 1/2014 |
| CN | 103581676 A | 2/2014 |
| CN | 103716623 A | 4/2014 |
| CN | 103997650 A | 8/2014 |
| CN | 104125466 A | 10/2014 |
| CN | 104735451 A | 6/2015 |
| CN | 104853217 A | 8/2015 |
| CN | 104935927 A | 9/2015 |
| CN | 105530518 A | 4/2016 |
| CN | 106254870 A | 12/2016 |
| CN | 106488242 A | 3/2017 |
| CN | 107211144 A | 9/2017 |
| EP | 2755388 A1 | 7/2014 |
| WO | 2010116268 A1 | 10/2010 |
| WO | 2017131233 A1 | 8/2017 |
| WO | 2017171370 A1 | 10/2017 |

OTHER PUBLICATIONS

Zhao, X., et al,"Enhanced Multiple Transform for Video Coding", 2016 Data Compression Conference, 10 pages.

Ugur, K., et al, "Appendix to Description of video coding technology proposal by Tandberg Nokia Ericsson," Joint Collaborative Team on Video Coding(JCT-VC) of ITU_T SG16 WP3 and ISO/IEC JTC1/SC29/WG11, Document: JCTVC-A119, 1st Meeting : Dresden, DE, Apr. 15-23, 2010, 56 pages.

An, J., et al, "Non-CE7: Boundary-Dependent Transform for Inter-Predicted Residue," Joint Collaborative Team on Video Coding (JCT-VC) of ITU-T SG16 WP3 and ISO/IEC JTC1/SC29/WG11, 7th Meeting: Geneva, CH., Nov. 21-30, 2011, Document: JCTVC-G281, 10 pages.

Zhao, Y., et al, "CE6: Spatially Varying Transform (Test 6.1.12.1)," Joint Video Experts Team (JVET) of ITU-TSG 16 WP 3 and 1SO/IEC JTC 1/SC 29/WG 11, Document: JVET-K0139-v1, 11th Meeting: Ljuhijana, SI, Jul. 10-18, 2018, 6 pages.

Said, A., et al, "Description of core experiment 6 (CE6): transforms and transform signaling," Joint Video Exerts Team (JVET) of ITU-T SG 1b WP 3 and ISO/IEC JTC 1/SC 29/WG 11, Document:JVET-K1026-v1, 11th Meeting: Ljubljana, SI, Jul. 10-18, 2018, 14 pages.

ITU-T H.265, "Series H: Audiovisual and Multimedia Systems Infrastructure of audiovisual services Coding of moving video, High efficiency video coding," Dec. 2016, 664 pages.

Zhang, C., et al, "Video Coding Using Spatially Varying Transform," IEEE Transactions on Circuits and Systems for Video Technology, vol. 21, No. 2, Feb. 2011, 14 pages.

Zhang, C., "Video Coding Using Variable Block-Size Spatially Varying Transforms" ICASSP 2009, 4 pages.

* cited by examiner

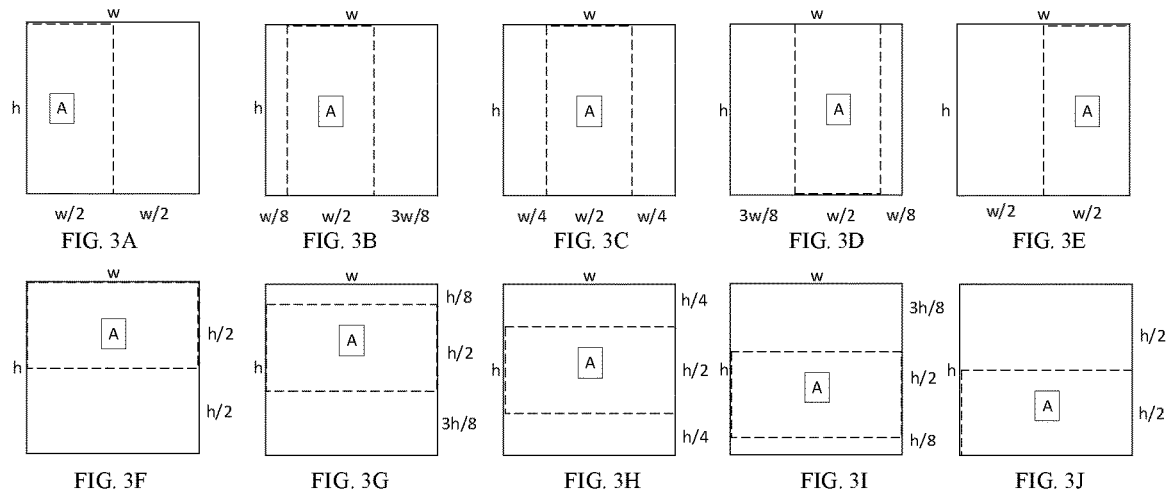
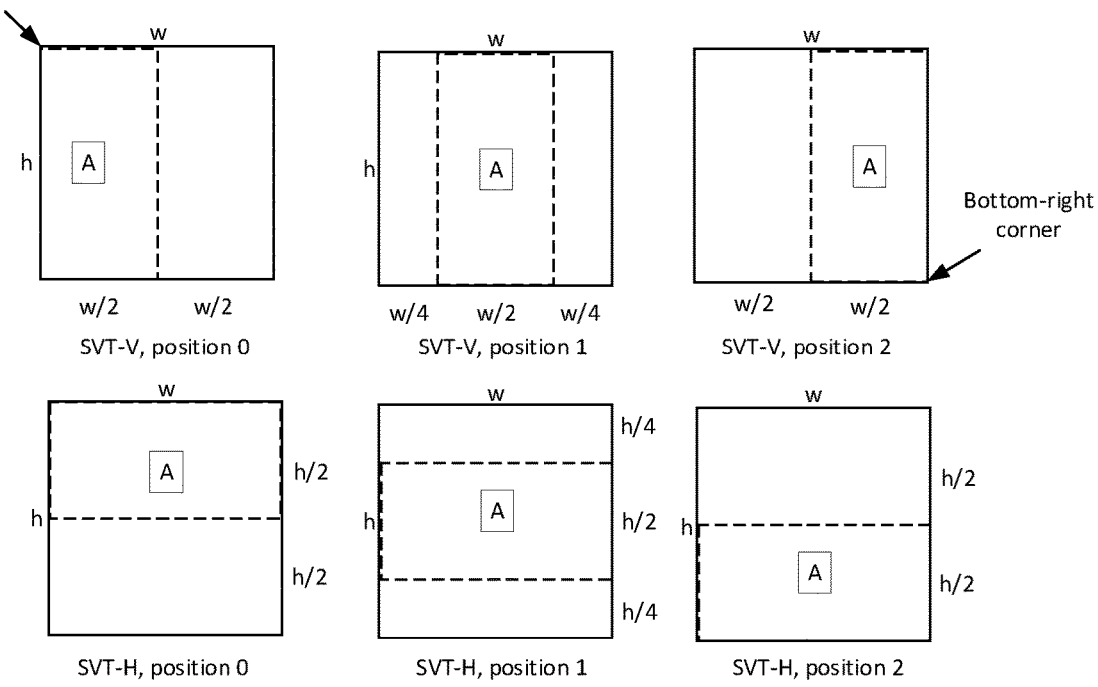
FIG. 4

SPATIALLY VARYING TRANSFORM WITH ADAPTIVE TRANSFORM TYPE

CROSS-REFERENCE TO RELATED APPLICATIONS

This application is a continuation of International Patent Application No. PCT/CN2019/088751 filed on May 28, 2019, which claims priority to U.S. provisional Patent Application No. 62/678,738 filed on May 31, 2018. The disclosures of the aforementioned applications are hereby incorporated by reference in their entireties.

TECHNICAL FIELD

The present disclosure relates to video decoding technologies, and in particular, to a video decoding method and a related apparatus employing spatially varying transform (SVT) with adaptive transform type.

BACKGROUND

Video coding like H.265 is based on a prediction plus transform framework. At encoder, an image block (containing a plurality of pixels) may be decomposed into a prediction block and a residual block, and the prediction information (e.g., prediction mode and motion vector information) and residual information (e.g., transform mode, transform coefficients and quantization parameter) are coded into a bitstream. At decoder, prediction information and residual information are parsed. According to the prediction information, intra or inter prediction is conducted to generate the prediction samples. According to the residual information, inverse quantization and inverse transform are conducted sequentially to generate residual samples. The prediction samples and the residual samples are added to obtain the reconstructed samples.

SVT was developed to improve video coding efficiency. For a rectangular residual block of width w and height h (i.e., w×h), a transform block smaller than the residual block is used to transform a part of the residual block, and the rest part of the residual block is not coded. The rationale behind SVT is that residual may not distribute evenly in a residual block. Using a smaller transform block with adaptive position can capture the major residual in the residual block, and thus may achieve better coding efficiency than transforming all residual in the residual block.

When SVT is applied for a residual block of size w×h, the size and position information of the transform block is coded into the video bitstream, and thus the decoder can reconstruct the transform block and compose it to the right place of the prediction block associated with the residual block.

In one example, three types of SVT block can be used for a residual block, as illustrated in FIG. 1.
1) SVT-I: $w\_t=w/2$, $h\_t=h/2$, where $w\_t$ and $h\_t$ denote the width and height of the transform block, respectively, and w and h denote the width and height of the residual block. In other words, the width and height of the transform block are both half of those of the residual block.
2) SVT-II: $w\_t=w/4$, $h\_t=h$.
3) SVT-III: $w\_t=w$, $h\_t=h/4$.

The type information of the SVT block are coded into bitstream.

The position of the transform block is represented by a position offset (x, y) to the top left corner of the residual block, where x means the horizontal distance between the top left corner of the transform block and that of the residual block in the unit of pixel, and y means the vertical distance between the top left corner of the transform block and that of the residual block in the unit of pixel. Each position that makes the transform block inside the residual block is a candidate position. For a residual block, the number of candidate positions is $(w-w\_t+1)\times(h-h\_t+1)$ for a type of SVT. Furthermore, for a 16×16 residual block, when SVT-I is used, there are 81 candidate positions, when SVT-II or SVT-III is used, there are 13 candidate positions. The x and y values are coded into bitstream. To reduce complexity for SVT-I, a subset of 32 positions are selected from the 81 candidate positions as the allowed candidate positions for SVT-I.

One drawback of the SVT scheme is the heavy signaling overhead of the position information. In addition, the encoder complexity may be significantly increased with the number of positions tested in rate-distortion optimization (RDO). Since the number of candidate positions increases with the size of the residual block, the overhead can be even bigger for larger residual blocks, like 32×32 or 64×128.

Another drawback of the SVT scheme is the size of transform block is ¼ of the residual block. The transform block is probably not large enough to cover the major residual in the residual block.

Therefore, a simplified SVT is developed, two types of SVT blocks are used for residual coding, denoted as SVT-H and SVT-V, as shown in FIG. 2.
1) SVT-V: $w\_t=w/2$ and $h\_t=h$.
2) SVT-H: $w\_t=w$ and $h\_t=h/2$.

SVT-V is similar to SVT-II and SVT-H is similar to SVT-III. Compared with SVT-II and SVT-III, the transform block in SVT-V and SVT-H is enlarged to half of the residual block, which can cover more residual in the residual block.

Candidate positions are decided by a candidate position step size (CPSS). Accordingly, candidate positions are separated with an equal space specified by the CPSS. The number of candidate positions is reduced to no more than 5, which mitigates the overhead of position information as well as the encoder complexity for deciding the best transform block position.

SUMMARY

The present disclosure discloses a video decoding method and a related apparatus employing SVT with adaptive transform type, to improve decoding quality.

The foregoing and other objects are achieved by the subject matter of the independent claims. Further implementation forms are apparent from the dependent claims, the description and the figures.

According to a first aspect the disclosure relates to a video decoding method. The method is performed by a video decoding apparatus. The method includes determining the usage of SVT for a residual block, determining a SVT type for the residual block when SVT is used for the residual block, wherein the SVT type for the residual block is either SVT-V or SVT-H, determining a transform block position of a transform block of the residual block, determining a transform type of the transform block, wherein the transform type indicates a horizontal transform and a vertical transform for the transform block, wherein at least one of the horizontal transform and the vertical transform is discrete sine transform (DST)-7, and reconstructing the residual block based on the transform type, the transform block position and transform coefficients of the transform block.

In a possible implementation form of the method according to the first aspect, when the SVT type for the residual block is SVT-V, and the transform block position of the transform block is a position covers the top-left corner of the residual block, the horizontal transform is discrete cosine transform (DCT)-8, and the vertical transform is DST-7.

In a possible implementation form of the method according to the first aspect, when the SVT type for the residual block is SVT-V, and the transform block position of the transform block is a position covers the right-bottom corner of the residual block, the horizontal transform is DST-7, and the vertical transform is DST-7.

In a possible implementation form of the method according to the first aspect, when the SVT type for the residual block is SVT-H, and the transform block position of the transform block is a position covers the top-left corner of the residual block, the horizontal transform is DST-7, and the vertical transform is DCT-8.

In a possible implementation form of the method according to the first aspect, when the SVT type for the residual block is SVT-H, and the transform block position of the transform block is a position covers the right-bottom corner of the residual block, the horizontal transform is DST-7, and the vertical transform is DST-7.

According to a second aspect the disclosure relates to a video decoding apparatus, comprising a unit configured to determine the usage of SVT for a residual block, a unit configured to determine a SVT type for the residual block when SVT is used for the residual block, wherein the SVT type for the residual block is either SVT-V or SVT-H, a unit configured to determine a transform block position of a transform block of the residual block, a unit configured to determine a transform type of the transform block, wherein the transform type indicates a horizontal transform and a vertical transform for the transform block, wherein at least one of the horizontal transform and the vertical transform is DST-7, and a unit configured to reconstruct the residual block based on the transform type, the transform block position and transform coefficients of the transform block.

In a possible implementation form of the method according to the second aspect, when the SVT type for the residual block is SVT-V, and the transform block position of the transform block is a position covers the top-left corner of the residual block, the horizontal transform is DCT-8, and the vertical transform is DST-7.

In a possible implementation form of the method according to the second aspect, when the SVT type for the residual block is SVT-V, and the transform block position of the transform block is a position covers the right-bottom corner of the residual block, the horizontal transform is DST-7, and the vertical transform is DST-7.

In a possible implementation form of the method according to the second aspect, when the SVT type for the residual block is SVT-H, and the transform block position of the transform block is a position covers the top-left corner of the residual block, the horizontal transform is DST-7, and the vertical transform is DCT-8.

In a possible implementation form of the method according to the second aspect, when the SVT type for the residual block is SVT-H, and the transform block position of the transform block is a position covers the right-bottom corner of the residual block, the horizontal transform is DST-7, and the vertical transform is DST-7.

According to a third aspect the disclosure relates to a video decoding apparatus, comprising one or more processors, and a non-transitory computer-readable storage medium coupled to the processors and storing programming for execution by the processors, wherein the programming, when executed by the processors, configures the decoder to perform the method according to the first aspect.

According to a fourth aspect the disclosure relates to a non-volatile computer-readable storage medium storing computer instructions, that when executed by one or more processors, cause the one or more processors to perform the steps of the method according to the first aspect.

It can be seen that, the present disclosure adaptively uses multiple transform types for transform block based on the SVT type and position information, thus can improve decoding quality and decoding efficiency. Further, the quantity of the transform algorithm is limited in some embodiments, thus can simplify the realization of the decoding apparatus.

BRIEF DESCRIPTION OF DRAWINGS

FIGS. 3A, 3B, 3C, 3D, 3E, 3F, 3G, 3H, 3, and 3J are illustrations of candidate positions of SVT-V and SVT-H blocks.
FIG. 4 is an illustration of SVT-V and SVT-H with 3 candidate positions.

DESCRIPTION OF EMBODIMENTS

Figure 1:
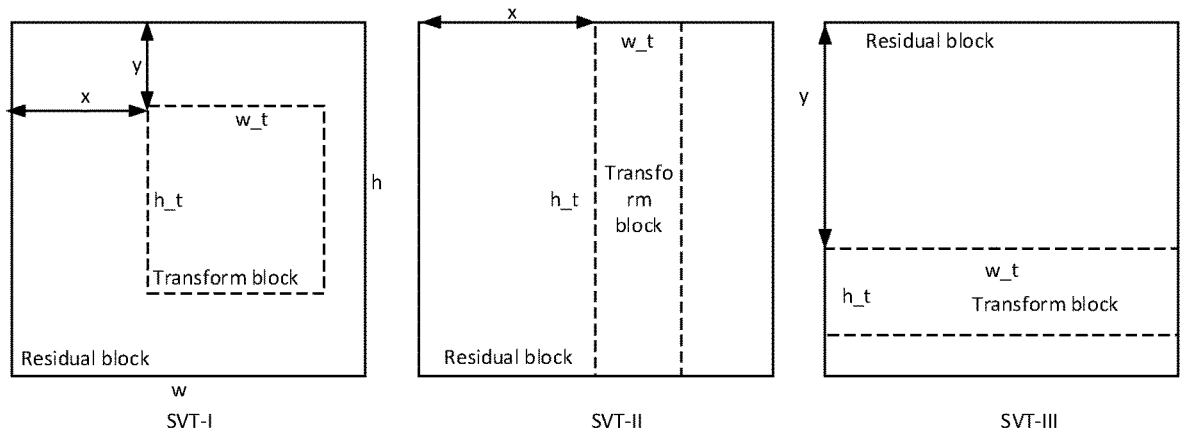
FIG. 1 is an illustration of SVT-I, SVT-II and SVT-III.
Figure 2:
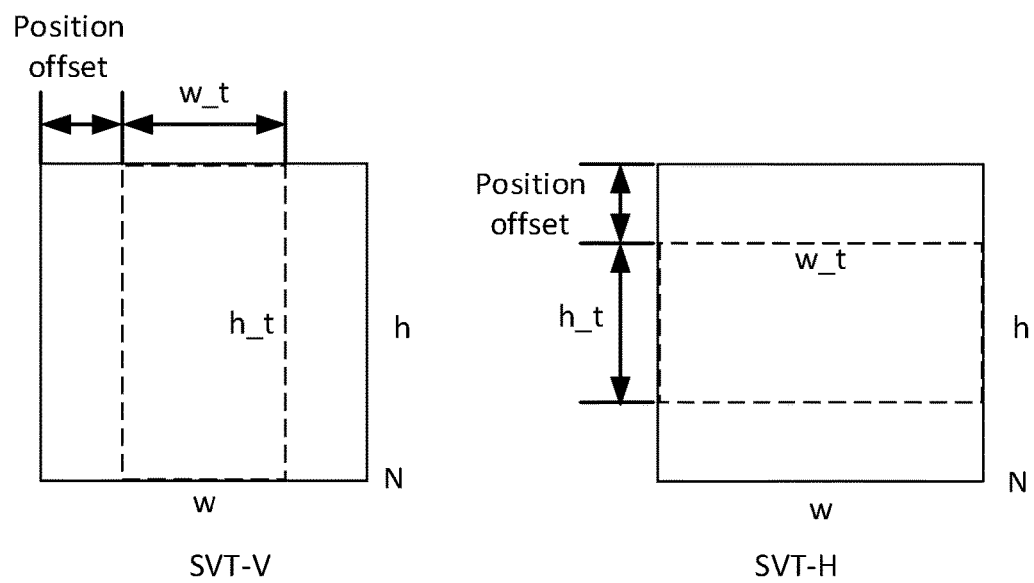
FIG. 2 is an illustration of SVT-V and SVT-H.

The present disclosure introduces an improved SVT scheme. The improvement is that the type of horizontal transform and the type of vertical transform of an SVT block are determined based on the SVT type and SVT block position. The horizontal transform can be different from the vertical transform.

A first embodiment describes the process of decoding a residual block. A bitstream containing at least one picture of video data is decoded. A picture is split into a plurality of rectangular image regions and each region corresponds to a coding tree unit (CTU). A CTU is partitioned into a plurality of blocks, such as the coding units in High Efficiency Video Coding (HEVC), according to block partition information contained in the bitstream. The coding information of the blocks is parsed from the bitstream and pixels of the blocks are reconstructed based on the coding information.

In one embodiment, SVT is restricted to being used for inter-predicted blocks. In another embodiment, SVT may also be used for intra-predicted blocks.

In one example, SVT may be allowed for blocks using a specific inter prediction method (e.g., translation model based motion compensation) but not allowed for blocks using some other inter prediction methods (e.g., affine model based motion compensation). In another example, SVT may be allowed for prediction blocks using merge mode or advanced motion vector prediction (AMVP) mode with ¼-pel motion vector difference precision, but not allowed for prediction blocks using affine merge mode, affine inter mode or AMVP mode with 1-pel or 4-pel motion vector difference precision. In another example, SVT may be allowed for prediction blocks using merge mode with a merge index smaller than 2, but not allowed for prediction blocks using merge mode with a merge index not smaller than 2. The merge mode and AMVP mode can be referred to in H.265/HEVC standard. Affine merge mode and affine inter mode can be referred to in Joint Exploration Model (JEM) codec from Joint Video Exploration Team (JVET).

In one example, a block may refer to a coding unit, where the coding unit may contain one prediction block and one residual block. The prediction block may contain all prediction samples of the coding unit, the residual block may contain all residual samples of the coding unit, and the prediction block is of the same size as the residual block. In another example, a block may refer to a coding unit, a coding unit may contain two prediction blocks and one residual block, each prediction block may contain a part of prediction samples of the coding unit, and a residual block may contain all residual samples of the coding unit. In another example, a block may refer to a coding unit, a coding unit may contain two prediction blocks and four residual blocks. The partition pattern of residual blocks in a coding unit may be signaled in the bitstream, such as the residual quad-tree (RQT) in HEVC.

A block may contain only Y component (luma) of image samples (or pixels), or it may contain Y, U (chrominance) and V (chrominance) components of image samples.

A residual block Ro of size w×h can be reconstructed by the following steps.

Step 1. Determine the transform block size of the residual block Ro.

Step 1.1. Determine the usage of SVT according to a syntax element. For a residual block which is allowed to use SVT, if the residual block has non-zero transform coefficients of Y component (or it has non-zero transform coefficients of any color component), a flag (namely svt_flag) is parsed from the bitstream. The flag indicates whether the residual block is coded using a transform block of the same size as the residual block (e.g., svt_flag=0) or the residual block is coded with a transform block of a size smaller than the size of the residual block (e.g., svt_flag=1). Whether a block has non-zero transform coefficients of a color component may be indicated by a coded block flag (cbf) of the color component, as used in HEVC. Whether a block has non-zero transform coefficients of any color component may be indicated by a root cbf, as used in HEVC.

In one example, a block is allowed to use SVT if the following conditions are satisfied: 1) the block is predicted using inter prediction; and 2) either the block width or block height falls in a pre-determined range [a1, a2], e.g., a1=16 and a2=64, or a1=8 and a2=64, or a1=16 and a2=128. The value of a1 and a2 can be fixed values. The value also can be derived from a sequence parameter set (SPS) or a slice header.

In another example, a block is allowed to use SVT if the following conditions are satisfied: 1) the block is predicted using merge mode with merge index smaller than a threshold (e.g., 1 or 2 or 3) or using AMVP mode with ¼-pel motion vector difference precision; 2) one dimension of the block falls in a pre-determined range [a1, a2], and the other dimension of the block is not greater than a threshold a3, e.g., a1=8, a2=32 and a3=32. Parameter a1 may be set as twice of minimum transform size, a2 and a3 may both be set as the maximum transform size. The value of a1, a2 and a3 can be fixed values. The value also can be derived from an SPS or a slice header.

If the block does not use SVT, the transform block size is set as w×h. Otherwise, Step 1.2 is applied to decide the transform size.

Step 1.2. Determine the type of SVT according to a syntax element, and derive the transform block size according to the SVT type. Allowed SVT types for the residual block are decided based on the width and height of the residual block.

SVT-V is allowed if w is in the range [a1, a2] and h is not greater than a3, SVT-H is allowed if h is in the range [a1, a2] and w is not greater than a3. SVT may be only used for the Y component, or it may be used for all three components, i.e., Y component, U component and V component. When SVT is only used for the Y component, the Y component residual is transformed by SVT and the U and V components are transformed according to the size of the residual block.

When both SVT-V and SVT-H are allowed, one flag (namely svt_type_flag) is parsed from the bitstream, which indicates whether SVT-V is used (e.g., svt_type_flag=0) or SVT-H is used (e.g., svt_type_flag=1) for the residual block, and the transform block size is set according to the signaled SVT type (i.e., w_t=w/2 and h_t=h for SVT-V, and w_t=w and h_t=h/2 for SVT-H). When only SVT-V is allowed or only SVT-H is allowed, the svt_type_flag is not parsed from the bitstream, and the transform block size is set according to the allowed SVT type.

Step 2. Determine the transform block position according to a syntax element, and determine the transform type for the transform block based on the type of SVT and the transform block position information.

Step 2.1: Determine the transform block position according to a syntax element.

A position index P is parsed from the bitstream, and the position offset Z of the top left corner of the transform block to the top left corner of the residual block is determined as Z=s×P, where s is a CPSS. The value of P is among 0, 1, . . . , $$\frac{w - w\_t}{s}$$

if SVT-V is used, or the value of P is among 0, 1, . . . , $$\frac{h - h\_t}{s}$$

if SVT-H is used. Furthermore, let (0, 0) represent the coordinate of the top left corner of the residual block, the coordinate of the top left corner of the transform block is (Z, 0) for SVT-V or (0, Z) for SVT-H.

In one example, the CPSS is calculated as s=w/M1 for SVT-V or s=h/M2 for SVT-H, where w and h are the width and height of the residual block, respectively, and M1 and M2 are pre-determined integers in range of 2 to 8. More candidate positions are allowed with a larger M1 or M2 value. In this example, M1 and M2 are both set as 8. Therefore, the value of P is among 0 to 4. The candidate positions are illustrated in FIGS. 3A-3J.

In another example, the CPSS is calculated as s=max(w/M1, Th1) for SVT-V or s=max(h/M2, Th2) for SVT-H, where Th1 and Th2 are pre-defined integers specifying a minimum step size. Th1 and Th2 are integers no less than 2. In this example, Th1 and Th2 are set as 4, and M1 and M2 are set as 8. In this example, different block sizes may have different number of candidate positions. For example, when w=8, 2 candidate positions (as illustrated by FIG. 3A and FIG. 3E) are available to choose, when w=16, 3 candidate positions (as illustrated by FIG. 3B, FIG. 3C and FIG. 3D) are available to choose, when w>16, 5 positions are available to choose.

In another example, the CPSS is calculated as s=w/M1 for SVT-V or s=h/M2 for SVT-H, where M1 and M2 are set as 4. Accordingly, 3 candidate positions are allowed.

In another example, the CPSS is calculated as s=w/M1 for SVT-V or s=h/M2 for SVT-H, where M1 and M2 are set as 2. Accordingly, 2 candidate positions are allowed.

In another example, the CPSS is calculated as s=max(w/M1, Th1) for SVT-V or s=max(h/M2, Th2) for SVT-H, where T1 and T2 are set as 2, M1 is set as 8 if w≥h or is set as 4 if w<h, and M2 is set as 8 if h≥w or is set as 4 if h<w. In this case, the number of candidate positions for SVT-H or SVT-V may further depend on the aspect ratio of the residual block.

In another example, the CPSS is calculated as s=max(w/M1, Th1) for SVT-V or s=max(h/M2, Th2) for SVT-H, where the values of M1, M2, Th1 and Th2 are derived from a high-level syntax structure in the bitstream (e.g., SPS). M1 and M2 may share the same value parsed from a syntax element, and Th1 and Th2 may share the same value parsed from another syntax element.

The position index P may be binarized into one or more bins using truncated unary code. For example, if the P value is in the range of 0 to 4, P value 0, 4, 2, 3 and 1 are binarized as 0, 01, 001, 0001 and 0000, respectively, if the P value is in the range of 0 to 1, P value 0 and 1 are binarized as 0 and 1, respectively.

The position index P may be binarized into one or more bins using one most probable position and several remaining positions. When the left and top neighbors are available, the most probable position may be set as the position covering the bottom-right corner of the residual block. In one example, if the P value is in the range of 0 to 4 and position 4 is set as the most probable position, P value 4, 0, 1, 2 and 3 are binarized as 1, 000, 001, 010 and 011, respectively, if the P value is in the range of 0 to 2 and position 2 is set as the most probable position, P value 2, 0 and 1 are binarized as 1, 01 and 00, respectively.

Step 2.2: determine the transform type for the transform block based on the type of SVT and transform block position information. The transform type includes the horizontal transform and vertical transform of a 2-D separable transform.

Taking the case that 3 candidate positions are allowed for an example, as shown in FIG. 4. Position 0 covers the top-left corner, and position 2 covers the bottom-right corner. Position 1 is at the middle of the residual block. There are three positions for both SVT-V and SVT-H, as shown in FIG. 4.

In another example, 2 candidate positions are allowed. Position 0 covers the top-left corner, and position 1 covers the bottom-right corner (the same as position 2 in FIG. 4). That is, there are two positions for both SVT-V and SVT-H.

A two-dimensional transform may be separable into one-dimensional (1D) horizontal transform and vertical transform. A forward two-dimensional (2D) transform which turns residual into transform coefficients may be realized by first applying horizontal transform on a residual block to generate a block TA and then applying vertical transform on the block TA to generate a transform coefficient block, as implemented in JEM codec. Accordingly, an inverse 2D transform which turns transform coefficients back to residual may be realized by first applying inverse vertical transform on a transform coefficient block to generate a block TB and then applying inverse horizontal transform on the block TB to generate a residual block, as implemented in JEM codec.

In one example, the horizontal and vertical transforms for SVT-V position 0 are DCT-8 and DST-7, the horizontal and vertical transforms for SVT-V position 1 are DST-1 and DST-7, the horizontal and vertical transforms for SVT-V position 2 are DST-7 and DST-7, the horizontal and vertical transforms for SVT-H position 0 are DST-7 and DCT-8, the horizontal and vertical transforms for SVT-H position 1 are DST-7 and DST-1, the horizontal and vertical transforms for SVT-H position 2 are DST-7 and DST-7, as listed in Table I. In this example, the vertical transform for SVT-V and the horizontal transform for SVT-H are set as DST-7, and the other transform is based on SVT position.

TABLE I

An example of 1-D horizontal and vertical transforms for different SVT types and positions.

| SVT type, position | horizontal transform | vertical transform |
|---|---|---|
| SVT-V, position 0 | DCT-8 | DST-7 |
| SVT-V, position 1 | DST-1 | DST-7 |
| SVT-V, position 2 | DST-7 | DST-7 |
| SVT-H, position 0 | DST-7 | DCT-8 |
| SVT-H, position 1 | DST-7 | DST-1 |
| SVT-H, position 2 | DST-7 | DST-7 |

In another example, the horizontal transform and vertical transform for different SVT types and positions are listed in Table II. In this example, the vertical transform for SVT-V and the horizontal transform for SVT-H are set as DCT-2, and the other transform is based on SVT position.

TABLE II

An example of 1-D horizontal and vertical transforms for different SVT types and positions.

| SVT type, position | horizontal transform | vertical transform |
|---|---|---|
| SVT-V, position 0 | DCT-8 | DCT-2 |
| SVT-V, position 1 | DST-1 | DCT-2 |
| SVT-V, position 2 | DST-7 | DCT-2 |
| SVT-H, position 0 | DCT-2 | DCT-8 |
| SVT-H, position 1 | DCT-2 | DST-1 |
| SVT-H, position 2 | DCT-2 | DST-7 |

In another example, the horizontal transform and vertical transform for different SVT types and positions are listed in Table III. In this example, the horizontal transform and vertical transform are decided only by SVT position.

TABLE III

An example of 1-D horizontal and vertical transforms for different SVT types and positions.

| SVT type, position | horizontal transform | vertical transform |
|---|---|---|
| SVT-V, position 0 | DCT-8 | DCT-8 |
| SVT-V, position 1 | DST-1 | DST-1 |
| SVT-V, position 2 | DST-7 | DST-7 |
| SVT-H, position 0 | DCT-8 | DCT-8 |
| SVT-H, position 1 | DST-1 | DST-1 |
| SVT-H, position 2 | DST-7 | DST-7 |

In another example, the horizontal transform and vertical transform for different SVT types and positions are listed in Table IV.

TABLE IV

An example of 1-D horizontal and vertical transforms for different SVT types and positions.

| SVT type, position | horizontal transform | vertical transform |
|---|---|---|
| SVT-V, position 0 | DST-7 | DCT-8 |
| SVT-V, position 1 | DST-7 | DST-1 |
| SVT-V, position 2 | DST-7 | DST-7 |
| SVT-H, position 0 | DCT-8 | DST-7 |
| SVT-H, position 1 | DST-1 | DST-7 |
| SVT-H, position 2 | DST-7 | DST-7 |

In another example, the horizontal transform and vertical transform for different SVT types and positions are listed in Table V.

TABLE V

An example of 1-D horizontal and vertical transforms for different SVT types and positions.

| SVT type, position | horizontal transform | vertical transform |
|---|---|---|
| SVT-V, position 0 | DCT-8 | DST-7 |
| SVT-V, position 1 | DCT-2 | DST-7 |
| SVT-V, position 2 | DST-7 | DST-7 |
| SVT-H, position 0 | DST-7 | DCT-8 |
| SVT-H, position 1 | DST-7 | DCT-2 |
| SVT-H, position 2 | DST-7 | DST-7 |

In another example, the horizontal transform and vertical transform for different SVT types and positions are listed in Table VI.

TABLE VI

An example of 1-D horizontal and vertical transforms for different SVT types and positions.

| SVT type, position | horizontal transform | vertical transform |
|---|---|---|
| SVT-V, position 0 | DCT-8 | DCT-2 |
| SVT-V, position 1 | DCT-2 | DCT-2 |
| SVT-V, position 2 | DST-7 | DCT-2 |
| SVT-H, position 0 | DCT-2 | DCT-8 |
| SVT-H, position 1 | DCT-2 | DCT-2 |
| SVT-H, position 2 | DCT-2 | DST-7 |

The position-dependent multiple transforms may be applied to luma transform block only, and the corresponding chroma transform blocks always use inverse DCT-2 in the inverse transform process.

Step 3. Parse transform coefficients of the transform block based on the transform block size.

This is a commonly used process in video decoding, such as the transform coefficients parsing in HEVC or H.264/Advanced Video Coding (AVC). The transform coefficients may be coded using run-length coding or coded more sophisticated as a set of transform coefficient groups (CG).

Step 3 may be conducted before Step 2.

Step 4. Reconstruct the residual block Ro based on the transform coefficients and the transform block position and the type of inverse transform.

Inverse quantization and inverse transform of size w_t× h_t are applied to the transform coefficients to recover residual samples. The size of the residual samples is w_t× h_t, which is the same to the transform block size. The inverse transform is a 2-D separable transform. The dequantized transform coefficient block is first transformed by an inverse vertical transform to generate a block TC and then the block TC is transformed by an inverse horizontal transform, in which the inverse horizontal transform and inverse vertical transform are decided in Step 2.2 based on transform block position or based on both transform block position and SVT type of the transform block.

The residual samples are assigned to a corresponding region inside the residual block Ro, according to the transform block position, and the rest samples inside the residual block are set to be zero. For example, if SVT-V is used and the number of candidate position is 5 and the position index is 4, the reconstructed residual samples are assigned to region A in FIG. 3E and the region of size (w/2)×h to the left of region A has zero residual.

After conducting Step 1 to Step 4, the reconstructed residual block may be composed with a prediction block to generate the reconstructed samples in a coding unit. A filtering process may be applied on the reconstructed samples later, such as deblocking filter and sample adaptive offset (SAO) processing in HEVC.

Unlike some other solutions, the present disclosure adaptively uses multiple transform types for transform block based on the SVT type and position information.

Figure 5:
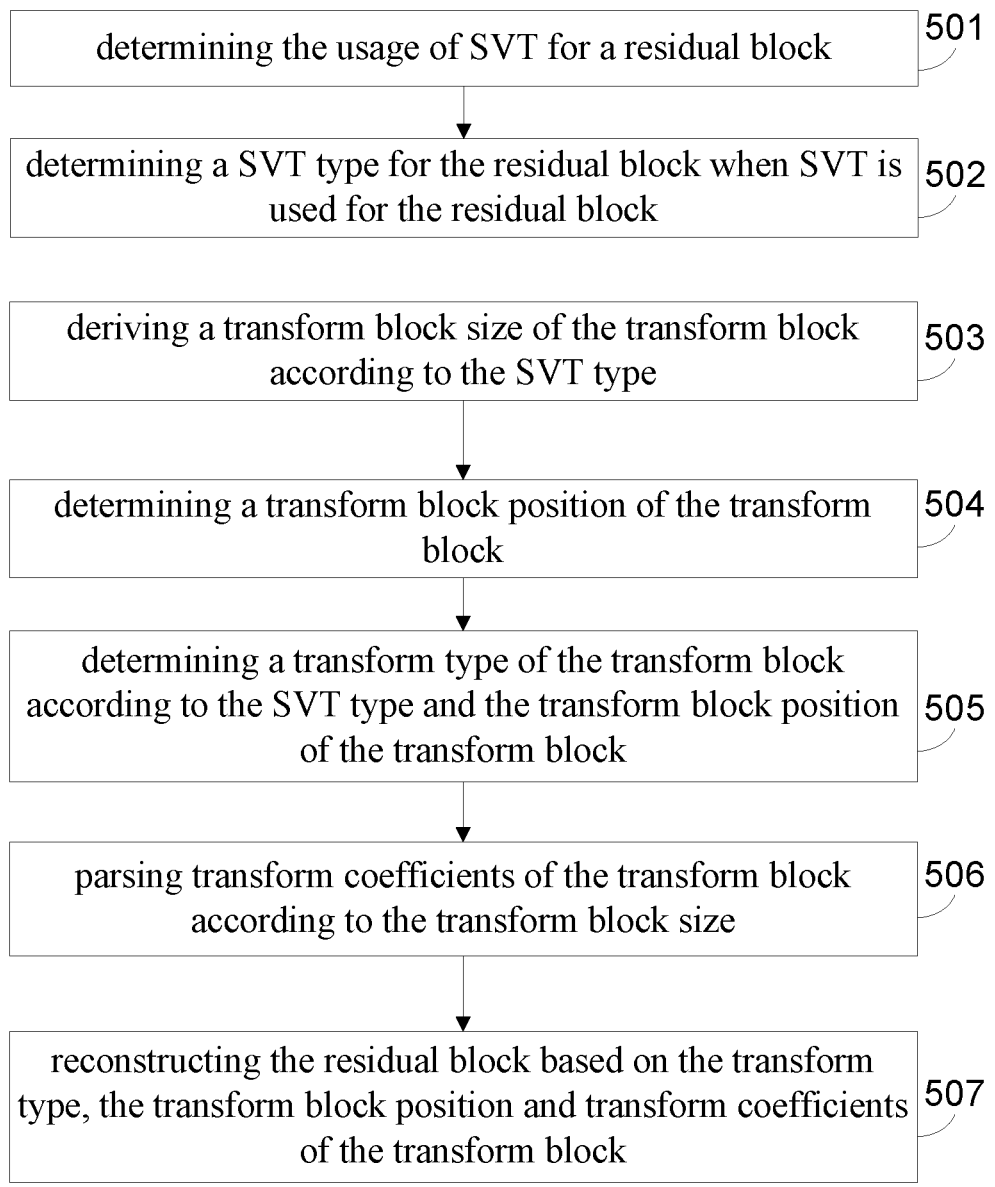
FIG. 5 is a flowchart of a video decoding method according to an embodiment of the present disclosure.
Figure 6:
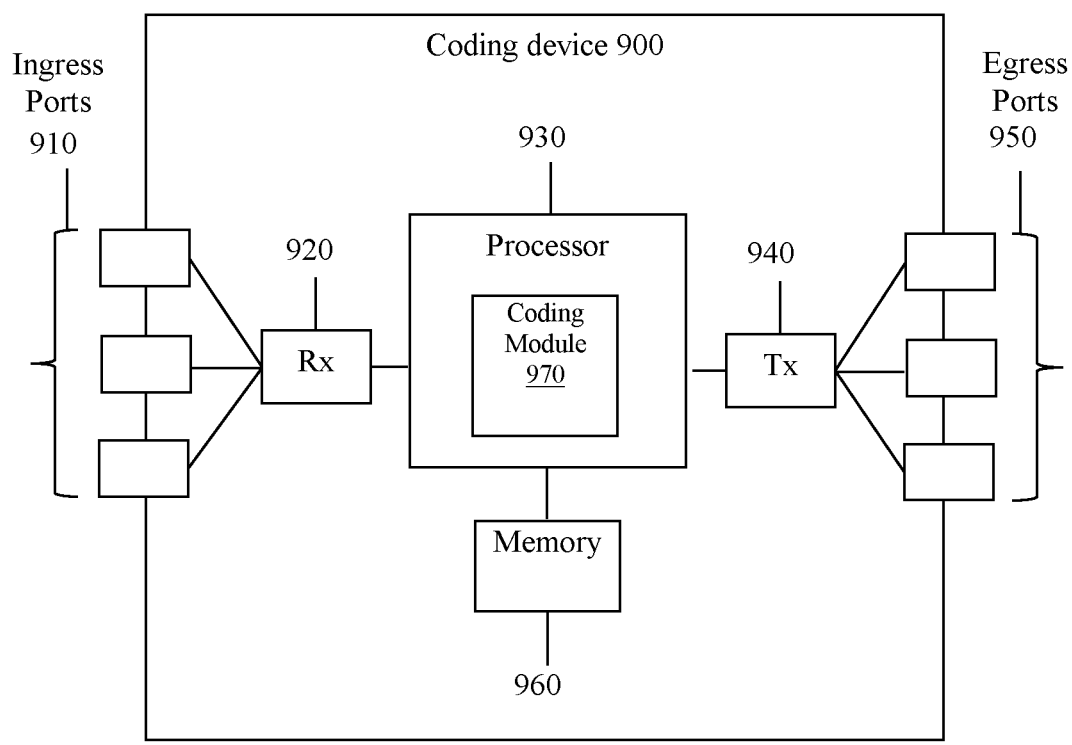
FIG. 6 is a schematic structural diagram of a video decoding apparatus according to an embodiment of the present disclosure.

FIG. 5 is a flowchart of an example method of video decoding employing SVT with adaptive transform type.

The method may be initiated at a decoder upon receiving a bitstream. The method employs the bitstream to determine prediction blocks and transformed residual blocks. The method may also determine transform blocks, which is employed to determine residual blocks. The residual blocks and the prediction blocks are then employed to reconstruct image blocks. It should be noted that while method is described from the perspective of the decoder, a similar method may be employed (e.g., in reverse) to encode the video by employing SVT. Where the method includes the following steps.

Step 501, determining the usage of SVT for a residual block. The specific process of the determining is similar to step 1.1.

Step 502, determining a SVT type for the residual block when SVT is used for the residual block, wherein the SVT type for the residual block is either a SVT-V type or a SVT-H type, where the SVT-V type indicates that the width of a transform block of the residual block is the half size of the width of the residual block, and the height of the transform block is the same size of the height of the residual block (as shown in FIG. 4), where the SVT-H type indicates that the width of the transform block is the same size of the width of the residual block, and the height of the transform block is the half size of the height of the residual block (as shown in FIG. 4). The specific process of the determining is similar to step 1.2.

Step 503, deriving a transform block size of the transform block according to the SVT type. The specific process of the deriving is similar to step 1.2.

Step 504, determining a transform block position of the transform block. The specific process of the determining may similar to step 2.1.

Alternatively, when the candidate positions for a SVT type is two, a one bit flag may be employed to indicate the transform block position of the transform block of the residual block.

For example, when only positions 0 and 2 of FIG. 4 are employed for SVT-V, a one bit flag is enough to indicate whether the transform block position is position 0 or position 2. When only positions 0 and 2 of FIG. 4 are employed for SVT-H, a one bit flag is enough to indicate whether the transform block position is position 0 or position 2.

Step 505, determining a transform type of the transform block according to the SVT type and the transform block position of the transform block, wherein the transform type indicates a horizontal transform and a vertical transform for the transform block, wherein at least one of the horizontal transform and the vertical transform is DST-7. The specific process of the determining may similar to step 2.2.

The specific transform type can be any transform type of any one of the tables I, IV and V as described above, or may be any transform type that includes DST-7 of any one of the tables II, III and VI as described above.

For example, when the SVT type for the residual block is the SVT-V type, and the transform block position of the transform block is a position covers the top-left corner of the residual block (that is, position 0 of FIG. 4), the horizontal transform is DCT-8, and the vertical transform is DST-7.

For example, when the SVT type for the residual block is the SVT-V type, and the transform block position of the transform block is a position covers the right-bottom corner of the residual block (that is, position 2 of FIG. 4), the horizontal transform is DST-7, and the vertical transform is DST-7.

For example, when the SVT type for the residual block is the SVT-H type, and the transform block position of the transform block is a position covers the top-left corner of the residual block (that is, position 0 of FIG. 4), the horizontal transform is DST-7, and the vertical transform is DCT-8.

For example, when the SVT type for the residual block is the SVT-H type, and the transform block position of the transform block is a position covers the right-bottom corner of the residual block (that is, position 2 of FIG. 4), the horizontal transform is DST-7, and the vertical transform is DST-7.

Step 506, parsing transform coefficients of the transform block according to the transform block size. The specific process of the parsing may similar to step 3.

Step 507, reconstructing the residual block based on the transform type, the transform block position and transform coefficients of the transform block. The specific process of the determining may similar to step 4.

It can be seen that, the present disclosure adaptively uses multiple transform types for transform block based on the SVT type and position information, thus can improve decoding quality and decoding efficiency. Further, the quantity of the transform algorithm is limited in some embodiments, thus can simplify the realization of the decoding apparatus.

The present disclosure discloses a video decoding apparatus that is configured to implement the techniques of the present application, the video decoding apparatus includes following.

A unit configured to determine the usage of SVT for a residual block. The specific process of the determine is similar to step 1.1.

A unit configured to determine a SVT type for the residual block when SVT is used for the residual block, wherein the SVT type for the residual block is either a SVT-V type or a SVT-H type, wherein the SVT-V type indicates that the width of a transform block of the residual block is the half size of the width of the residual block, and the height of the transform block is the same size of the height of the residual block, wherein the SVT-H type indicates that the width of the transform block is the same size of the width of the residual block, and the height of the transform block is the half size of the height of the residual block. The specific process of the determine is similar to step 1.2.

A unit configured to derive a transform block size of the transform block according to the SVT type. The specific process of the deriving is similar to step 1.2.

A unit configured to determine a transform block position of the transform block. The specific process of the determine may similar to step 2.1. Alternatively, when the candidate positions for a SVT type is two, a one bit flag may be employed to indicate the transform block position of the transform block of the residual block. For example, when only positions 0 and 2 of FIG. 4 are employed for SVT-V, a one bit flag is enough to indicate whether the transform block position is position 0 or position 2. When only positions 0 and 2 of FIG. 4 are employed for SVT-H, a one bit flag is enough to indicate whether the transform block position is position 0 or position 2.

A unit configured to determine a transform type of the transform block according to the SVT type and the transform block position of the transform block, wherein the transform type indicates a horizontal transform and a vertical transform for the transform block, wherein at least one of the horizontal transform and the vertical transform is DST-7. The specific process of the determine may similar to step 2.2.

A unit configured to parse transform coefficients of the transform block according to the transform block size. The specific process of the parse may similar to step 3.

A unit configured to reconstruct the residual block based on the transform type, the transform block position and transform coefficients of the transform block. The specific process of the determining may similar to step 4.

The specific transform type can be any transform type of any one of the tables I, IV and V as described above, or may be any transform type that includes DST-7 of any one of the tables II, III and VI as described above.

For example, when the SVT type for the residual block is the SVT-V type, and the transform block position of the transform block is a position covers the top-left corner of the residual block (that is, position 0 of FIG. 4), the horizontal transform is DCT-8, and the vertical transform is DST-7.

For example, when the SVT type for the residual block is the SVT-V type, and the transform block position of the transform block is a position covers the right-bottom corner of the residual block (that is, position 2 of FIG. 4), the horizontal transform is DST-7, and the vertical transform is DST-7.

For example, when the SVT type for the residual block is the SVT-H type, and the transform block position of the transform block is a position covers the top-left corner of the residual block (that is, position 0 of FIG. 4), the horizontal transform is DST-7, and the vertical transform is DCT-8.

For example, when the SVT type for the residual block is the SVT-H type, and the transform block position of the transform block is a position covers the right-bottom corner of the residual block (that is, position 2 of FIG. 4), the horizontal transform is DST-7, and the vertical transform is DST-7.

The present disclosure discloses another video decoding apparatus that is configured to implement the techniques of the present application, the video decoding apparatus including one or more processors, and a non-volatile computer-readable storage medium coupled to the processors and storing programming for execution by the processors, wherein the programming, when executed by the processors, configures the video decoding apparatus to process any of the methods as stated above.

The present disclosure discloses a non-volatile computer-readable storage medium storing computer instructions, that when executed by one or more processors, cause the one or more processors to perform the steps of any of the methods as stated above.

FIG. 9 is a schematic diagram of a coding device 900 according to an embodiment of the disclosure. The coding device 900 is suitable for implementing the disclosed embodiments as described herein. The coding device 900 comprises ingress ports 910 and receiver units (Rx) 920 for receiving data, a processor, logic unit, or central processing unit (CPU) 930 to process the data, transmitter units (Tx) 940 and egress ports 950 for transmitting the data, and a memory 960 for storing the data. The coding device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960. The processor 930 comprises a coding module 970. The coding module 970 implements the disclosed embodiments described above. For instance, the coding module 970 implements, processes, parses, prepares, or provides the various graphics processes and calculations. The inclusion of the coding module 970 therefore provides a substantial improvement to the functionality of the device 900 and effects a transformation of the device 900 to a different state. Alternatively, the coding module 970 is implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and/or non-volatile and may be read-only memory (ROM), random-access memory (RAM), ternary content-addressable memory (TCAM), and/or static RAM (SRAM).

The following references are incorporated herein by reference as if reproduced in their entirety.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A video decoding method comprising:
   determining a usage of a spatially varying transform (SVT) for a residual block;
   determining an SVT type for the residual block when the SVT is used for the residual block, wherein the SVT type is either an SVT-vertical (V) type or an SVT-horizontal (H) type, wherein the SVT-V type indicates that a first width of a transform block of the residual block is half of a second width of the residual block and a first height of the transform block is the same as a second height of the residual block, wherein the SVT-H type indicates that the first width is the same as the second width and the first height is half of the second height;
   deriving a transform block size of the transform block according to the SVT type;
   determining a transform block position of the transform block;
   determining a transform type of the transform block according to the SVT type and the transform block position, wherein the transform type indicates a horizontal transform and a vertical transform for the transform block, and wherein at least one of the horizontal transform or the vertical transform is based on a discrete sine transform (DST)-7;
   parsing transform coefficients of the transform block according to the transform block size; and
   reconstructing the residual block based on the transform type, the transform block size, the transform block position, and the transform coefficients.

2. The video decoding method of claim 1, wherein the SVT type for the residual block is the SVT-V type, wherein the transform block position covers a top-left corner of the residual block, wherein the horizontal transform is based on a discrete cosine transform (DCT)-8, and wherein the vertical transform is based on the DST-7.

3. The video decoding method of claim 1, wherein the SVT type is the SVT-V type, wherein the transform block position covers a right-bottom corner of the residual block, wherein the horizontal transform is based on the DST-7, and wherein the vertical transform is based on the DST-7.

4. The video decoding method of claim 1, wherein the SVT type is the SVT-H type, wherein the transform block position covers a top-left corner of the residual block, wherein the horizontal transform is based on the DST-7, and wherein the vertical transform is based on a discrete cosine transform (DCT)-8.

5. The video decoding method of claim 1, wherein the SVT type is the SVT-H type, wherein the transform block position covers a right-bottom corner of the residual block, wherein the horizontal transform is based on the DST-7, and wherein the vertical transform is based on the DST-7.

6. A video decoding apparatus comprising:
   a first system configured to determine a usage of a spatially varying transform (SVT) for a residual block;
   a second system coupled to the first system and configured to determine an SVT type for the residual block when the SVT is used for the residual block, wherein the SVT type is either an SVT-vertical (V) type or an SVT-horizontal (H) type, wherein the SVT-V type indicates that a first width of a transform block of the residual block is half of a second width of the residual block and a first height of the transform block is the same as a second height of the residual block, wherein the SVT-H type indicates that the first width is the same as the second width and the first height is half of the second height;

a third system coupled to the second system and configured to derive a transform block size of the transform block according to the SVT type;

a fourth system configured to determine a transform block position of the transform block;

a fifth system coupled to the second system and the fourth system and configured to determine a transform type of the transform block according to the SVT type and the transform block position, wherein the transform type indicates a horizontal transform and a vertical transform for the transform block, and wherein at least one of the horizontal transform or the vertical transform is based on a discrete sine transform (DST)-7;

a sixth system coupled to the third system and configured to parse transform coefficients of the transform block according to the transform block size; and a seventh system coupled to the fourth system, the fifth system, and the sixth system and configured to reconstruct the residual block based on the transform type, the transform block position, and the transform coefficients.

7. The video decoding apparatus of claim 6, wherein the SVT type is the SVT-V type, wherein the transform block position covers a top-left corner of the residual block, wherein the horizontal transform is based on a discrete cosine transform (DCT)-8, and wherein the vertical transform is based on the DST-7.

8. The video decoding apparatus of claim 6, wherein the SVT type is the SVT-V type, wherein the transform block position covers a right-bottom corner of the residual block, wherein the horizontal transform is based on the DST-7, and wherein the vertical transform is based on the DST-7.

9. The video decoding apparatus of claim 6, wherein the SVT type is the SVT-H type, wherein the transform block position covers a top-left corner of the residual block, wherein the horizontal transform is based on the DST-7, and wherein the vertical transform is based on a discrete cosine transform (DCT)-8.

10. The video decoding apparatus of claim 6, wherein the SVT type is the SVT-H type, wherein the transform block position covers a right-bottom corner of the residual block, wherein the horizontal transform is based on the DST-7, and wherein the vertical transform is based on the DST-7.

11. A video decoding apparatus comprising:

a non-transitory computer-readable storage medium configured to store instructions; and a processor coupled to the non-transitory computer-readable storage medium, wherein the instructions cause the processor to be configured to:

determine a usage of a spatially varying transform (SVT) for a residual block;

determine an SVT type for the residual block when the SVT is used for the residual block, wherein the SVT type is either an SVT-vertical (V) type or an SVT-horizontal (H) type, wherein the SVT-V type indicates that a first width of a transform block of the residual block is half of a second width of the residual block and a first height of the transform block is the same as a second height of the residual block, and wherein the SVT-H type indicates that the first width is the same as the second width and the first height is half of the second height;

derive a transform block size of the transform block according to the SVT type;

determine a transform block position of the transform block;

determine a transform type of the transform block according to the SVT type and the transform block position, wherein the transform type indicates a horizontal transform and a vertical transform for the transform block, and wherein at least one of the horizontal transform or the vertical transform is based on a discrete sine transform (DST)-7;

parse transform coefficients of the transform block according to the transform block size; and reconstruct the residual block based on the transform type, the transform block position, and the transform coefficients.

12. The video decoding apparatus of claim 11, wherein the SVT type is the SVT-V type, wherein the transform block position covers a top-left corner of the residual block, wherein the horizontal transform is based on a discrete cosine transform (DCT)-8, and wherein the vertical transform is based on the DST-7.

13. The video decoding apparatus of claim 11, wherein the SVT type is the SVT-V type, wherein the transform block position covers a right-bottom corner of the residual block, wherein the horizontal transform is based on the DST-7, and wherein the vertical transform is based on the DST-7.

14. The video decoding apparatus of claim 11, wherein the SVT type is the SVT-H type, wherein the transform block position covers a top-left corner of the residual block, wherein the horizontal transform is based on the DST-7, and wherein the vertical transform is based on a discrete cosine transform (DCT)-8.

15. The video decoding apparatus of claim 11, wherein the SVT type is the SVT-H type, wherein the transform block position covers a right-bottom corner of the residual block, wherein the horizontal transform is based on the DST-7, and wherein the vertical transform is based on the DST-7.

16. A computer program product comprising computer-executable instructions for storage on a non-volatile computer-readable storage medium that, when executed by a processor, cause an apparatus to:

determine a usage of a spatially varying transform (SVT) for a residual block;

determine an SVT type for the residual block when the SVT is used for the residual block, wherein the SVT type is either an SVT-vertical (V) type or an SVT-horizontal (H) type, wherein the SVT-V type indicates that a first width of a transform block of the residual block is half of a second width of the residual block and a first height of the transform block is the same as a second height of the residual block, and wherein the SVT-H type indicates that the first width is the same as the second width and the first height is half of the second height;

derive a transform block size of the transform block according to the SVT type;

determine a transform block position of the transform block;

determine a transform type of the transform block according to the SVT type and the transform block position, wherein the transform type indicates a horizontal transform and a vertical transform for the transform block, and wherein at least one of the horizontal transform or the vertical transform is based on a discrete sine transform (DST)-7;

parse transform coefficients of the transform block according to the transform block size; and reconstruct the residual block based on the transform type, the transform block size, the transform block position, and the transform coefficients.

17. The computer program product of claim 16, wherein the SVT type is the SVT-V type, wherein the transform block position covers a top-left corner of the residual block, wherein the horizontal transform is based on a discrete cosine transform (DCT)-8, and wherein the vertical transform is based on the DST-7.

18. The computer program product of claim 16, wherein the SVT type is the SVT-V type, wherein the transform block position covers a right-bottom corner of the residual block, wherein the horizontal transform is based on the DST-7, and wherein the vertical transform is based on the DST-7.

19. The computer program product of claim 16, wherein the SVT type is the SVT-H type, wherein the transform block position covers a top-left corner of the residual block, wherein the horizontal transform is based on the DST-7, and wherein the vertical transform is based on a discrete cosine transform (DCT)-8.

20. The computer program product of claim 16, wherein the SVT type is the SVT-H type, wherein the transform block position covers a right-bottom corner of the residual block, wherein the horizontal transform is based on the DST-7, and wherein the vertical transform is based on the DST-7.

* * * * *